(12) United States Patent
Mederer

(10) Patent No.: US 10,667,639 B2
(45) Date of Patent: Jun. 2, 2020

(54) DEVICE AND METHOD FOR PROCESSING FOOD ITEMS

(71) Applicant: Carogusto AG, Amriswil (CH)

(72) Inventor: Herbert Mederer, Fürth (DE)

(73) Assignee: Carogusto AG, Amriswil (CH)

(*) Notice: Subject to any disclaimer, the term of this patent is extended or adjusted under 35 U.S.C. 154(b) by 0 days.

(21) Appl. No.: 15/771,224

(22) PCT Filed: Oct. 26, 2016

(86) PCT No.: PCT/EP2016/075811
§ 371 (c)(1),
(2) Date: Apr. 26, 2018

(87) PCT Pub. No.: WO2017/072180
PCT Pub. Date: May 4, 2017

(65) Prior Publication Data
US 2018/0310746 A1    Nov. 1, 2018

(30) Foreign Application Priority Data
Oct. 27, 2015  (DE) .......................... 10 2015 221 004

(51) Int. Cl.
*A47J 27/04* (2006.01)
*A47J 27/16* (2006.01)

(52) U.S. Cl.
CPC .............. *A47J 27/04* (2013.01); *A47J 27/16* (2013.01); *A47J 2027/043* (2013.01)

(58) Field of Classification Search
CPC .......... A47J 27/16; A47J 27/04; A47J 43/004; A47J 2027/043

USPC .......... 99/294, 300–334, 348, 357, 359–371, 99/419, 483, 516, 532–533
See application file for complete search history.

(56) References Cited

U.S. PATENT DOCUMENTS

| | | | |
|---|---|---|---|
| 3,139,343 A | 6/1964 | Baselt | |
| 4,250,959 A * | 2/1981 | Spasojevic | A47J 27/04 126/379.1 |
| 5,442,997 A * | 8/1995 | Branz | A47J 27/16 366/101 |
| 2002/0178932 A1 | 12/2002 | Cai | |
| 2011/0088558 A1 | 4/2011 | Farrell et al. | |
| 2014/0299159 A1* | 10/2014 | Helm | B05B 3/025 134/22.18 |

FOREIGN PATENT DOCUMENTS

| | | |
|---|---|---|
| CN | 201332962 Y | 10/2009 |
| CN | 102949092 A | 3/2013 |
| DE | 28 51 918 A1 | 6/1980 |
| DE | 10 2010 002 446 A1 | 9/2011 |
| DE | 102010002446 A1 | 9/2011 |
| DE | 10 2014 202 702 A1 | 4/2015 |

(Continued)

*Primary Examiner* — Phuong T Nguyen
(74) *Attorney, Agent, or Firm* — McGlew and Tuttle, P.C.

(57) ABSTRACT

A device for processing food items arranged in a receptacle includes a steam-generating unit for generating steam, and a steam supply unit, which is connected to the steam-generating unit, for supplying steam to the receptacle. The steam supply unit has a steam probe having at least one steam-dispensing opening, and also has a steam probe stroke drive for a stroke movement of the steam probe along a stroke axis.

20 Claims, 7 Drawing Sheets

(56) References Cited

FOREIGN PATENT DOCUMENTS

| | | |
|---|---|---|
| JP | 2003-70644 A | 3/2003 |
| JP | 2005-87524 A | 4/2005 |
| JP | 2005-305023 A | 11/2005 |
| JP | 2007-082926 A | 4/2007 |
| WO | 02/096252 A1 | 12/2002 |
| WO | 2007/017342 A1 | 2/2007 |
| WO | 2007-063845 A | 5/2009 |

* cited by examiner

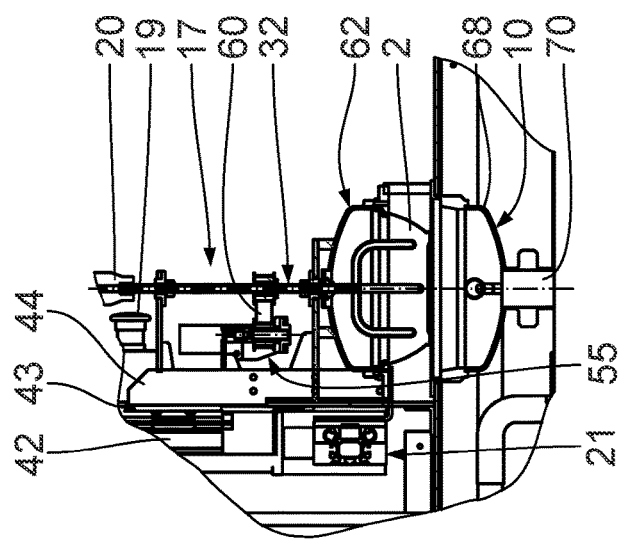
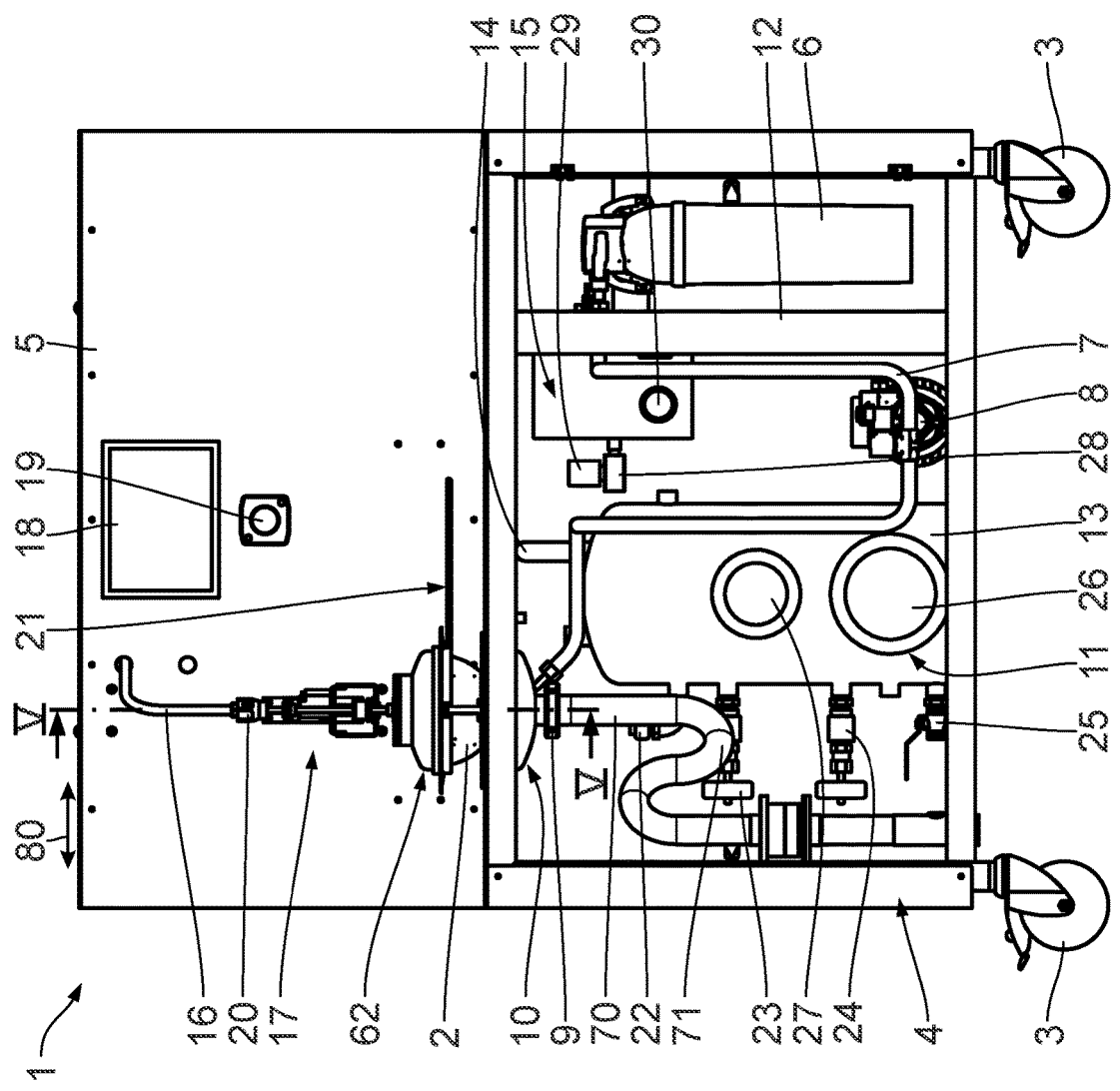

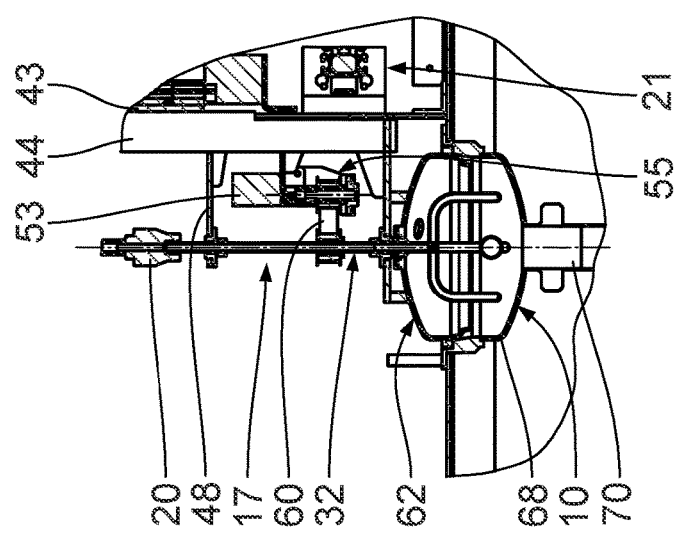
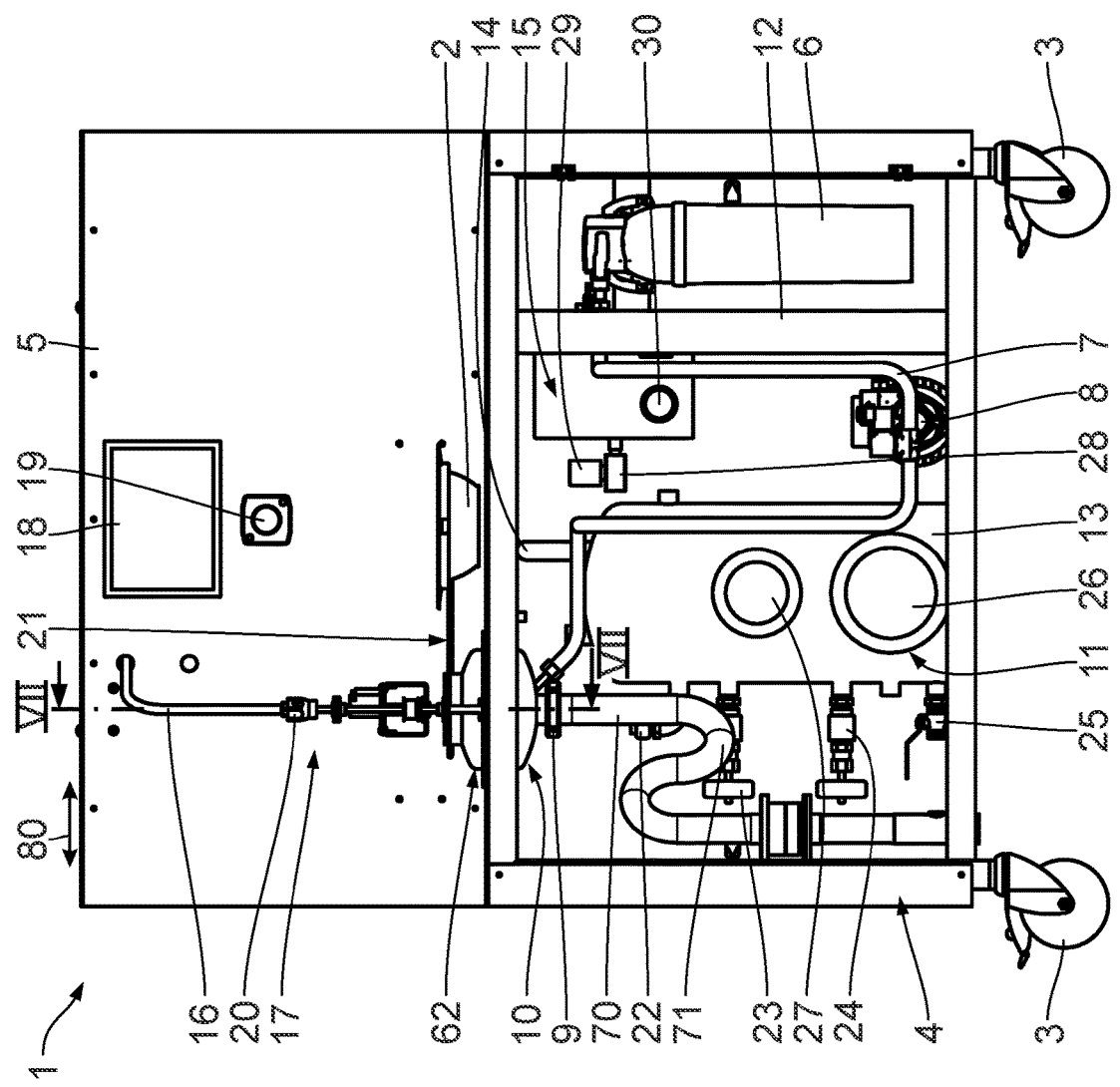

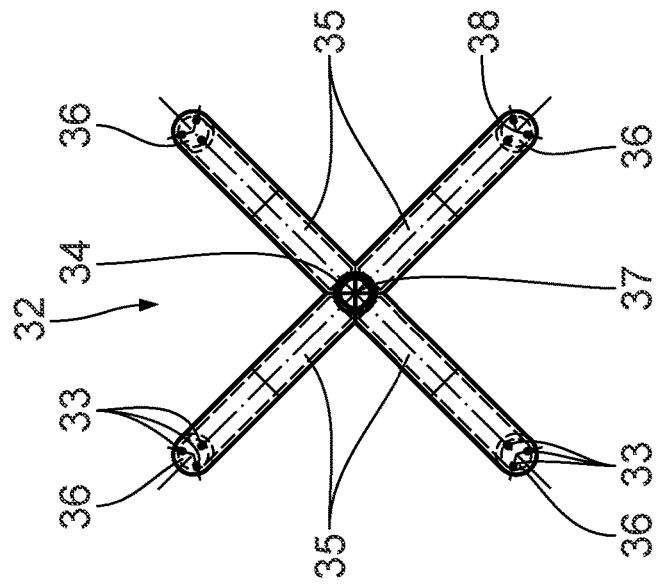
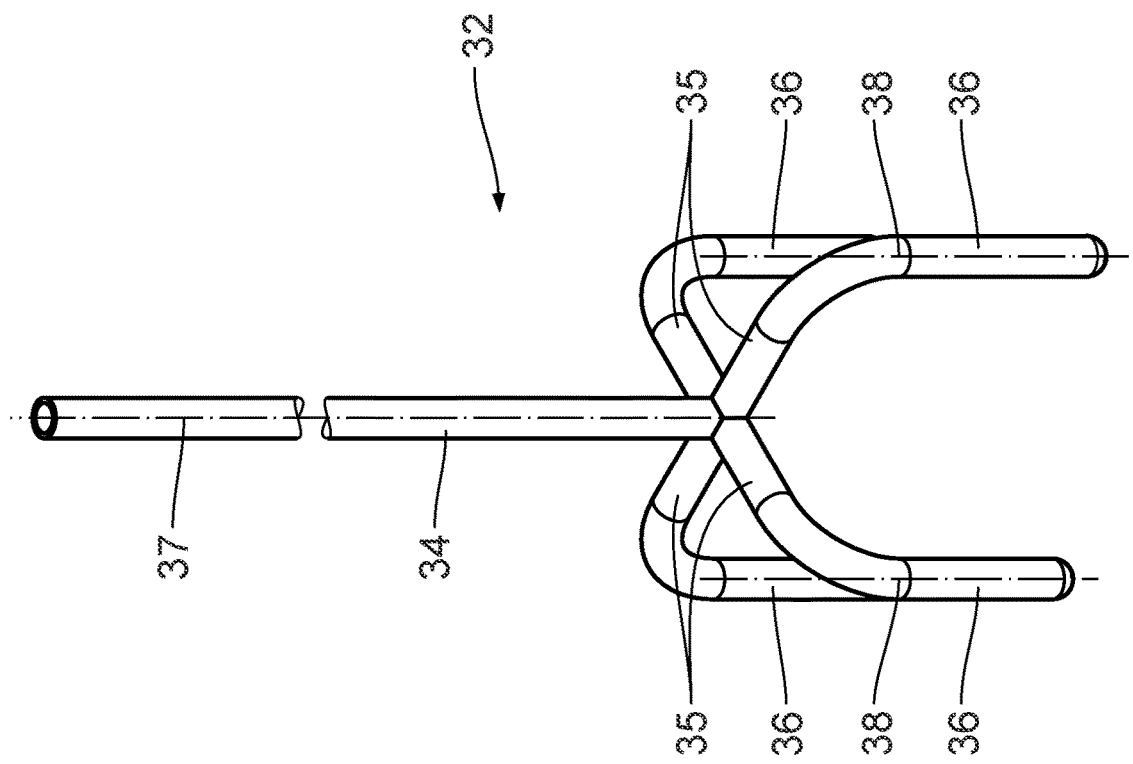

DEVICE AND METHOD FOR PROCESSING FOOD ITEMS

CROSS REFERENCE TO RELATED APPLICATIONS

This application is a United States National Phase Application of International Application PCT/EP2016/075811 filed Oct. 26, 2016 and claims the benefit of priority under 35 U.S.C. § 119 of German Patent Application Serial No. 10 2015 221 004.9 filed Oct. 27, 2015, the entire contents of which are incorporated herein by reference.

FIELD OF THE INVENTION

The present invention relates to a device and a method for processing food items.

BACKGROUND OF THE INVENTION

DE 10 2014 202 702 A1 discloses a device for preparing food. The food is stirred mechanically and heated by means of a stirring/heating unit. A complicated stirring drive is required for this purpose.

SUMMARY OF THE INVENTION

It is an object of the present invention to simplify the, in particular automated, processing of food items in a receptacle.

This object is achieved by a device for processing food items arranged in a receptacle, comprising
 a. a steam-generating unit for generating steam,
 b. a steam supply unit, which is connected to the steam-generating unit, for supplying steam to the receptacle, wherein the steam supply unit has
  i. a steam probe having at least one steam-dispensing opening,
  ii. a steam probe stroke drive for a stroke movement of the steam probe along a stroke axis
and by a method for processing food items arranged in a receptacle, comprising the following method steps
 providing a device as claimed in one of the preceding claims,
 providing the food items in the receptacle,
 shifting the steam probe along the stroke axis until at least one steam-dispensing opening is submerged into the food item,
 supplying steam,
 removing the steam probe from the food item.

The essence of the invention consists in that steam from a steam-generating unit can be supplied to the receptacle via a steam probe of a steam supply unit. For this purpose, the steam probe has at least one steam-dispensing opening. The steam probe is in particular of tubular design. The steam supply unit has a steam probe stroke drive in order to permit a stroke movement of the steam probe along a stroke axis at a stroke speed. The stroke axis is linear. The stroke movement by means of the steam probe stroke drive enables the steam probe with the at least one steam-dispensing opening to be submerged into the food items in the receptacle. To supply the steam probe to the receptacle, the stroke movement can take place at a first stroke speed. The first stroke speed which the steam probe stroke drive makes possible and/or permits for safety reasons can be a maximum speed. Owing to the first stroke speed being high, the steam probe can be supplied to the receptacle with a reduced expenditure of time. The first stroke speed is, for example, between 0.1 to 5 m/s, in particular 0.5 to 2.5 m/s and in particular approximately 1 m/s. The shifting at the first stroke speed is also referred to as an idle stroke. This means that no rotational movement of the steam probe takes place during the idle stroke. During the food item preparation, the steam probe can be moved up and down at a second stroke speed. This makes it possible to additionally improve the thorough mixing of the food items. In order to achieve thorough mixing of the food items in as homogeneous a manner as possible and/or in order to prevent the food items from being damaged, the second stroke speed is comparatively low, in particular lower than the first stroke speed. The second stroke speed is in particular at most 0.1 m/s, in particular at most 0.05 m/s and in particular at most 0.01 m/s. It is also possible to dispense with a stroke movement during the food item preparation. The second stroke speed is then equal to zero. It is possible to variably adjust the stroke speeds, in particular the second stroke speed, during the food preparation. For example, stroke speed profiles can be stored in a control unit such that the second stroke speed is variable during a food preparation cycle. A supply of steam directly into the food items is made possible. Complicated kinematics for stirring the food items are unnecessary according to the present invention. In particular, steam which is generated in the steam-generating unit serves for processing the food items. The steam can be supplied in particular at an increased pressure to the receptacle. The steam serves for heating the food items, for example a pasta dish with sauce. Other food items can also be processed by the device. The steam brings about mixing, in particular stirring of the food items, in the receptacle.

A device comprising a plurality of steam-dispensing openings, wherein in particular a first steam-dispensing opening is arranged in a first plane oriented perpendicularly to the stroke axis, wherein a second steam-dispensing opening is arranged in a second plane oriented perpendicularly to the stroke axis, and wherein the first plane and the second plane are arranged spaced apart from each other along the stroke axis, permits steam to be supplied at different positions, in particular with respect to the stroke axis. Owing to the fact that the steam-dispensing openings are mounted at different height positions on the steam probe, the food items can be acted upon with steam at various height positions. For example, it is thereby possible to supply sauce, which is arranged in the base region of the receptacle, by means of first steam-dispensing openings, and pasta, which is arranged above the sauce in the receptacle. The supply of steam can take place in a highly targeted manner in respect of the supply location. A stroke movement of the steam probe during the supply of steam is unnecessary. The kinematics for shifting the steam probe are simplified. In particular, the number and/or the cross-sectional area of the steam-dispensing openings predetermines a measure for the supplied energy. It is therefore possible to control the supplied quantity of energy depending on the food to be heated. For example, comparatively more energy in the form of steam is required for heating the sauce arranged in the base region than for the pasta arranged above the sauce. This can be realized in a particularly uncomplicated manner by the fact that more steam-dispensing openings are provided in the region of the sauce than in the region of the pasta.

A device wherein the steam probe has a plurality of free end portions, in particular four free end portions, wherein each end portion has at least one steam-dispensing opening, wherein in particular at least two end portions have different lengths ($L_1$, $L_2$), permits a targeted supply of steam. It is essential that the steam probe has a plurality of free end portions, i.e. in particular precisely two, in particular precisely three, in particular precisely four or more than four, in particular at most eight. The free end portions are referred to as lances. Steam can be supplied in a targeted manner to the food items via each of the plurality of free end portions of the steam probe. Each end portion can have one or more steam-dispensing openings. The finger-like end portions can extend from a central probe tube over a distribution portion.

A device comprising a receptacle covering, which is fastened to the steam probe, for lying in a sealing manner against the receptacle during the supply of steam, permits reliable closing of the receptacle during the supply of steam. A receptacle covering provided for this purpose is fastened to the steam probe. This means that a stroke movement of the steam probe directly brings about a stroke movement of the receptacle covering. By means of the sealing lying of the receptacle covering against the receptacle, it is ensured that contamination due to splashes of food items is prevented. Owing to the fact that the receptacle covering is fastened to the steam probe and a relative movement does not take place between the steam probe and the receptacle covering, the sealing of the receptacle covering in relation to the steam probe is substantially simplified. A static seal can be used. The use of a dynamic seal is unnecessary.

A device comprising a steam probe rotational drive for a rotational movement of the steam probe about the stroke axis, permits improved mixing of the food items. By means of the rotational movement of the steam probe about the stroke axis at a rotational speed, mechanical mixing of the food items in the receptacle takes place. The rotational speed is in particular variably adjustable. In particular, it is possible to change the rotational speed during the operation of the device, i.e. during the preparation of the food. The rotational speed is in particular between 1 $min^{-1}$ to 100 $min^{-1}$, in particular 5 $min^{-1}$ to 50 $min^{-1}$ and in particular between 10 $min^{-1}$ and 30 $min^{-1}$. In particular, the steam probe rotational drive is carried out independently of the steam probe stroke drive. This ensures that a stroke movement of the steam probe can be carried out independently of a rotational movement of the steam probe about the stroke axis. During the preparation of the food, any desired combination of the stroke movement and of the rotational movement of the steam probe is possible. It is possible to store various movement profiles in a controller of the device in order to obtain a previously determined, optimum mixing result depending on the food to be prepared. A movement profile may comprise, for example, the number of strokes, the stroke speed, the rotational speed and/or the direction of rotation. The rotational movement about the stroke axis in both directions is possible by means of the steam probe rotational drive. The kinematics of the device is simplified. In order to improve the mechanical mixing of the food items, it is advantageous if the steam probe has at least one mixing element which is arranged eccentrically with respect to the stroke axis. A mixing element of this type can be, for example, a free end portion of the steam probe.

A device comprising a receptacle-holding unit which in particular has a receptacle-shifting drive, permits a defined arrangement and holder for the receptacle. The automated supply of steam via the steam probe is simplified. A receptacle-shifting drive which is shiftable a shifting of the receptacle between a depositing/removal position and a preparation position is advantageous. In the depositing/removal position, it is easier for an operator of the device, in particular a customer, to deposit a receptacle into the receptacle-holding unit prior to the processing and to remove same again after the processing. From the preparation position, the device can be changed to a food-item-processing position by the steam probe being shifted downward by means of the steam probe stroke drive in such a manner that the steam probe can heat the food items in the receptacle. In the food-item-processing position, the processing of the food items in the receptacle can take place in a particularly uncomplicated manner. In the preparation position, the receptacle is arranged in particular below the steam probe along the stroke axis of the steam probe. The shifting drive is in particular a linear drive. A linear drive is of uncomplicated design.

A device comprising a cleaning unit for cleaning the steam supply unit, permits an integrated cleaning of the steam supply unit. Regular cleaning, in particular depending on the number of prepared food item portions, is possible in an uncomplicated and automated manner.

A device wherein the cleaning unit has a cleaning bowl and a cleaning spray head, permits direct washing off of food item residues from the steam probe and in particular from the receptacle covering fastened thereto.

A device wherein the receptacle covering lies in a sealing manner against the cleaning bowl in a cleaning position, ensures that the device is not dirtied by cleaning water during a cleaning operation. In particular, the cleaning bowl is designed in such a manner that the receptacle covering lies in a sealing manner against the latter.

A device comprising a steam-superheating unit, which is connected to the steam-generating unit, for superheating the steam generated in the steam-generating unit, permits superheating of the steam generated in the steam-generating unit to, for example, 250° C. The steam generated in the steam-generating unit typically has a temperature of up to 200° C. The steam-superheating unit permits an adjustable superheating temperature of 200° C. to 400° C. and in particular of 200° C. to 300° C. The steam supplied by the steam-generating unit of the steam-superheating unit has a water portion of approximately 70 g to 100 g based on 400 ml of process water. Owing to the fact that the steam is additionally superheated, the steam has a reduced water portion. It is possible, for example, to reduce the original water portion of the steam to at most 80% of the water portion with which the steam has been supplied, in particular to at most 70%, in particular to at most 65%, and in particular to at most 60%, and in particular to at most 50%. In the example mentioned, the water portion has been reduced by superheating in the steam-superheating unit to approximately 40 g to 60 g based on 400 ml of process water. In addition, it has been recognized that too strong a reduction in the water portion in the steam has a disadvantageous effect on the processing of the food items. If a minimum water portion of, for example, 30 g based on 400 ml of process water is fallen short of, insufficient heating of the product with the steam to be dried is provided or a desired heating lasts for a disproportionately long period, for example more than 30 s, and therefore such dry steam is not effectively usable in particular for the application in an automated food-item-processing process. Furthermore, it has been recognized that the stated water portion firstly enables a sufficient heating of the food items within a few seconds, in particular within 8 s to 12 s, in particular with continuous steaming of the food items. As a result, the method for processing the food items is simplified. In particular, it is possible to adapt the processing process to the food items to be processed. For example, a comparatively longer steaming of approximately 10 s to 12 s for highly pasty food items, for example meat sauce with tomatoes, is advantageous. In the case of less pasty products, such as liquid sauces and/or thin pasta and/or easily heatable products, such as carbonara sauce, a steaming duration of 8 s to 9 s may be sufficient.

Drier steam than from the steam-generating unit is advantageous for processing the food items. An undesirable softening of the food by an additional supply of water is avoided.

A device comprising a water-softening unit, permits sustained operation of the device, in particular when connected to a water mains supply network. It is quite safe to use mains water which, regionally dependently, may have large differences in water hardness, without complications. Water with a variably adjustable water hardness can be provided for the device by means of a water softening unit.

A device comprising a swivel joint for the rotatable coupling of the steam probe to a supply line, permits an uncomplicated coupling of the steam probe to a supply line. The coupling ensures that a rotational movement of the steam probe about the stroke axis can take place while the supply line is connected to the steam probe.

The method according to the invention essentially has the advantages of the device, to which reference is hereby made.

A method comprising rotation of the steam probe during the supply of steam, ensures improved thorough mixing of the food items in the receptacle, wherein a steam probe movement required for this purpose is simplified. A stroke movement of the steam probe during the supply of steam is unnecessary. In particular, during the supply of steam, only a rotational movement of the steam probe takes place.

A method comprising superheating of the steam before the steam is supplied, ensures the provision of dry steam.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is a view, corresponding to FIG. 1, of the device in a food-item-processing position;

FIG. 5 is an enlarged sectional view according to the intersecting line V-V in FIG. 4;

FIG. 6 is a view, corresponding to FIG. 1, of the device in a cleaning position;

FIG. 7 is an enlarged sectional view according to the intersecting line VII-VII in FIG. 6;

FIG. 9 is an enlarged perspective view of a steam probe of the device according to FIG. 1;

FIG. 10 is a view of the probe according to FIG. 9 from below; and

DESCRIPTION OF THE PREFERRED EMBODIMENTS

Figure 1:
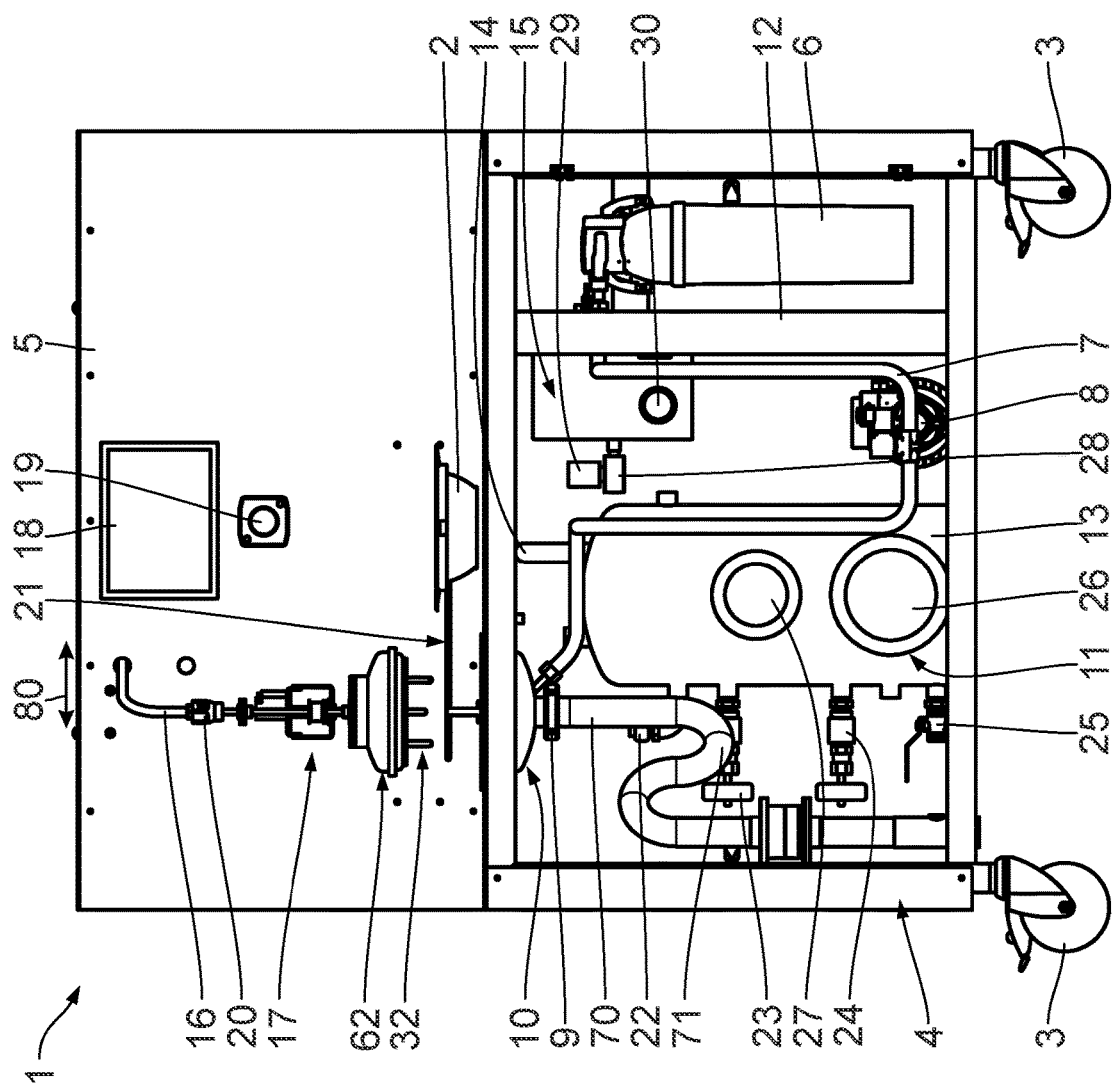
FIG. 1 is a side view of a device according to the present invention in a depositing/removal position.
Figure 2:
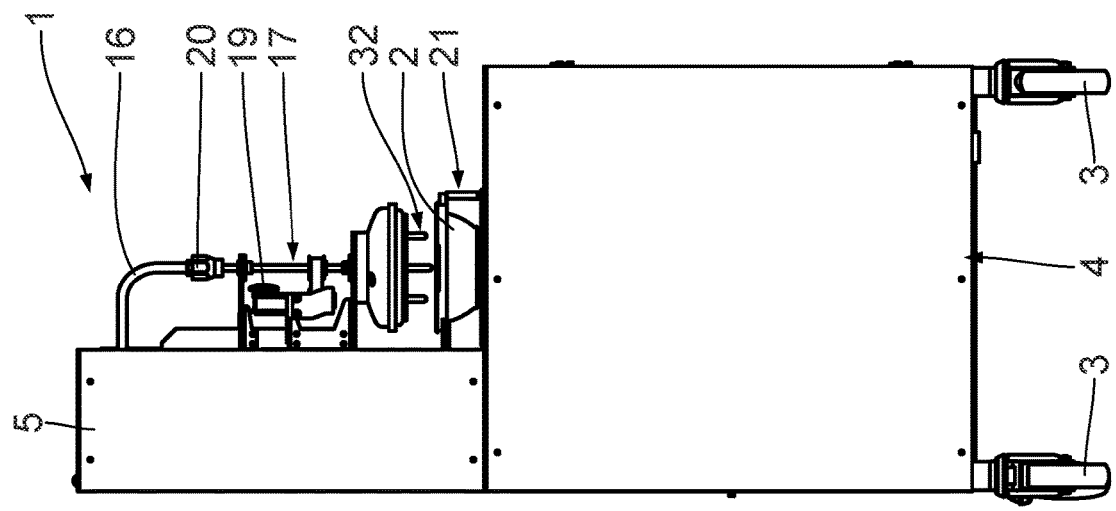
FIG. 2 is a further side view of the device according to FIG. 1.

A device 1 illustrated in FIGS. 1 to 11 serves for processing food items which are arranged in a receptacle 2 provided therefor. The device 1 has a framework which is movable on wheels 3 and comprises a lower housing 4 and an upper cabinet 5. The housing 4 is of square design and is designed such that it can be covered on the six side surfaces by means of cover panels. According to the illustration of FIG. 1, a front cover panel has been removed so that components arranged in the housing 4 are visible. The cabinet 5 is arranged on the housing 4. The cabinet 5 is of square design. The side surfaces of the cabinet 5 are covered with cover panels. The cabinet 5 has the same width as the housing 4. The cabinet 5 has a reduced depth in comparison to the housing 4. The cabinet 5 is connected to the housing 4. The cabinet 5 and the housing 4 form a unit.

A water-softening unit 6 is arranged in the housing 4. The shown front side of the housing 4 is divided by a vertical strut 12 into two window-like openings. The opening shown on the right in FIG. 1 can be designed so as to be openable by means of a pivotably coupled door. By means of a door (not illustrated) which is openable in such a manner, the accessibility to the water-softening unit 6 is simplified. The division, produced by the vertical strut 12, of the front side of the housing 4 is selected in such a manner that the interior, which is accessible via the door, of the housing 4 serves for storing the water-softening unit 6. In particular, a tool is not required for changing the filter cartridge and/or for cleaning the water-softening unit 6. The handling of the device 1 and in particular of the water-softening unit 6 is simplified. The water-softening unit 6 is a water filter system with an insertable filter cartridge. The water filter system is uncomplicated to handle; in particular, long-term use of the water filter system can be assured by regular changing of the filter cartridge. The cleaning of the filter system is simplified.

The water-softening unit 6 is connected to a domestic water connection for supply via a water intake line. The hose line required for this purpose is not shown for illustrative reasons.

A further hose line 7 is connected to the water-softening unit 6. The hose line 7 is designed as a flexible hose. The hose line 7 is connected via a substantially T-shaped distributing piece, on the one hand, to a pump 8 and, on the other hand, via a magnetic valve (not illustrated) to a cleaning spray head 9 of a cleaning unit 10. A further hose line (not illustrated) leads via the pump 8 into a steam-generating unit 11 which serves for generating steam from the water-softening unit 6. A nonreturn valve (not illustrated) is connected up to 10 bar to the pump 8. It is prevented by means of the nonreturn valve that water is pushed back out of the steam-generating unit 10 into the pump 8.

The steam-generating unit 11 comprises a boiler container 13 which is produced in particular from stainless steel and has an outer insulating layer. The boiler container is of substantially hollow-cylindrical design. The boiler container 13 has a filling volume of 25 l. A steam outlet opening to which a connecting line 14 is connected is provided on an upper curved lid. The boiler container 13 is fixedly screwed to the pump 8 and to the required fittings on a baseplate of the housing 4. All of the connections are of conical design, i.e. are metallically sealing, in order to avoid leakages.

The steam-generating unit 11 is connected to a steam-superheating unit 15 via the connecting line 14. A rigid pipe which is guided from the housing 4 into the cabinet 5 is connected to the steam-superheating unit 15. The rigid pipe is formed in particular from stainless steel and is heat-insulated. This ensures that as little energy as possible is lost by the transport of the hot steam and forms condensate. The rigid pipe is connected to a flexible hose line. The flexible hose line extends over approximately 200 mm in an unloaded state. The flexible hose line can be elongated elastically. In particular, the flexible hose line is extendable and compressible again. The flexible hose line is a supply line 16. The steam-superheating unit 15 is connected to a steam supply unit 17 via the supply line 16. The steam supply unit 17 serves for supplying steam to the receptacle 2.

An enclosure 31 for the supply line 16 and the steam supply unit 17 is provided on the cabinet 5. The enclosure 31 serves for protecting against incorrect operation by an inexperienced user. In particular, the intention is to avoid that a person makes contact with the movable parts during the preparation of the food, in particular during the shifting of the receptacle 2 and/or of the steam supply unit 17. The enclosure 31 is a protection device and reduces the risk of injury of an operator. The enclosure 31 is formed in particular from transparent or partially transparent material, for example glass or transparent plastic, in particular PMMA. The enclosure 31 has an opening through which the receptacle 2 can be shifted into the enclosure 31 toward the steam supply unit 17 or out of the enclosure away from the steam supply unit 17.

The device 1 has a central control unit (not illustrated specifically) by means of which various operations for handling the device 1 are controllable. The control unit has an input/output unit 18 in the form of a touchscreen. The screen serves for depicting method parameters, for example temperature and/or pressure of the steam supplied to the receptacle 2. Control commands can be input into the input/output unit 18 via the touch function of the touchscreen. An emergency off switch 19 in the form of a pushbutton is provided on the cabinet 5 below the input/output unit 18, in particular for protecting against erroneous operation.

The supply line 16 is coupled to the steam supply unit 17 via a swivel joint 20. The swivel joint 20 serves for kinematically decoupling the supply line 16 from the steam supply unit 17. The swivel joint 20 ensures that the steam supply unit 17 is rotatable in relation to the supply line 16. This ensures that rotation of the steam supply unit 17 does not lead to rotation of the supply line 16.

The swivel joint 20 is suitable for withstanding steam at an increased temperature and/or at an increased pressure. The swivel joint 20 is closed in a steam-proof manner.

A receptacle-holding unit 21 is provided on a lower side of the housing 2.

The steam-generating unit 11 is explained in more detail below. A safety valve 22 is connected to the boiler container 13. The safety valve 22 has a discharge pressure of 8 bar. A shutoff valve 23 and a sample-collecting tap 24 are arranged below the safety valve 22. An inspection glass display (not illustrated) for checking the filling level of the boiler can be provided between the shutoff valve 23 and the sample-collecting tap 24. The inspection glass display is in each case connected to the shutoff valve 23 and to the sample-collecting tap 24 via a suitable seal. A scouring valve 25 with a magnetic valve for automatic scouring of the boiler is provided below the sample-collecting tap 24 and in particular in the region of the base of the boiler container 13. The scouring of the boiler can be carried out as required or regularly, for example on the basis of regular time intervals which can be stored in particular in the control unit.

A two-stage heating unit 26 having a maximum heating power of 2·3.9 kW is guided on a side wall of the boiler container 13 into the interior of the boiler container 13. The heating unit 26 is sealed and is in particular arranged in a sealed manner on the boiler container 13 radially with respect to the longitudinal axis of the cylindrical boiler container 13. The heating unit 26 is an electric heating unit. Other heating sources are also conceivable. It is essential that the heating unit 26 is a heat source which serves for heating the water in the steam-generating unit 11.

A float switch 27 is provided above the heating unit 26. The float switch 27 serves for limiting the filling level of water in the steam-generating unit 15, in particular in the boiler container 13. The float switch 27 is guided into the boiler container 13 in a sealed manner via the cylinder side wall thereof.

The steam-superheating unit 15 is explained in more detail below. The steam-superheating unit 15 is connected to the steam-generating unit 11. The steam-superheating unit 15 has an inlet opening 28 with a magnetic valve 29 coupled thereto. Electrical energy can be supplied to the steam-superheating unit 15 via a current connection (not illustrated) for superheating the steam supplied from the steam-generating unit 11. A desired setpoint temperature for the superheated steam can be set by means of a thermostat 30 having a rotary knob. The region of the adjustable setpoint temperature lies between 200° C. and 300° C. according to the exemplary embodiment shown. Depending on the desired application, the setpoint temperature can also be smaller than 200° C. or greater than 300° C.

The steam supply unit 17 is explained in more detail below. The steam supply unit 17 has a tubular steam probe 32. The steam probe 32 is coupled directly to the swivel joint 20. The steam probe 32 has an inner lumen through which steam which is supplied to the steam probe 32 via the supply line 16 can be dispensed into the receptacle 2. For the dispensing of the steam, the steam probe 32 has a plurality of steam-dispensing openings 33. The steam-dispensing openings 33 each have a diameter of at most 2 mm, in particular of at most 1.5 mm and in particular of at most 1 mm.

The steam probe 32 has a central tube 34, on the lower end of which, which is arranged opposite the swivel joint 20, a cross-shaped distributing piece 35 is formed, in particular integrally. The distributing piece 35 is adjoined by four end portions 36 which are in each case bent in an L-shaped manner. The end portions 36 are arranged spaced apart equally with respect to the longitudinal axis 37 of the central tube 34. An opening angle with respect to the tube longitudinal axis 37 between two adjacent end portions 36 is 90°.

It is also possible to arrange the end portions 36 at unequal spacings with respect to the tube longitudinal axis 37. It is also conceivable to provide more or fewer than four end portions 36. It is advantageous if at least one element of the steam probe 32 is arranged eccentrically with respect to the tube longitudinal axis 37 as a mixing element.

The steam-dispensing openings 33 are in each case arranged at the respectively lower spherical-dome-shaped ends of the free end portions 36. According to the exemplary embodiment shown, three steam-dispensing openings 33 which are spaced apart equally with respect to an end portion longitudinal axis 38, i.e. are arranged at a 120° opening angle to one another with respect to the end portion longitudinal axis 38 are provided on each end portion 36. The size and/or the number of steam-dispensing openings 33 can vary depending on the quantity of energy to be supplied, i.e. depending on the quantity of steam to be supplied.

The steam probe 32 is in particular produced integrally from stainless steel. The steam probe 32 can have an adhesion-preventing coating, in particular a coating of polytetrafluoroethylene (PTFE) in order to avoid the food items adhering to the steam probe 32. In particular, all of the outer surfaces of the steam probe 32 and all of the inner surfaces of the steam probe 32 are formed with the adhesion-preventing coating. A further advantage of said adhesion-preventing coating consists in that food items do not burn and in particular heated fat is detached from the surface during cleaning. In particular, the adhesion-preventing coating is food-safe.

In the case of the steam probe 32, the end portions 36 which are in each case arranged lying diametrically opposite with respect to the tube longitudinal axis 37 are of identical design. Two adjacent end portions 36 in each case differ in design from each other. According to the exemplary embodiment shown, the different design of the adjacent end portions 36 is provided by the fact that a first end portion has a first length $L_1$ and a second end portion has a second length $L_2$, wherein the first length $L_1$ is greater than the second length $L_2$. First steam-dispensing openings 33 which are arranged on a first plane oriented perpendicularly to the tube longitudinal axis 37 are arranged on the end portions 36 having the first length $L_1$. Correspondingly, second steam-dispensing openings 33 are arranged at the ends of the shorter end portions 36, which have the second length $L_2$ in a manner oriented in a second plane perpendicular to the tube longitudinal axis 37. The first plane and the second plane are arranged spaced apart from each other along the tube longitudinal axis 37. The end portion longitudinal axes 38 are oriented parallel to each other. The end portion longitudinal axis 38 is oriented parallel to the tube longitudinal axis 37. The distance between the first plane and the second plane corresponds to the difference of the first length $L_1$ from the second length $L_2$.

The steam supply unit 17 has a steam probe stroke drive 39. The steam probe stroke drive 39 permits a stroke movement of the steam probe 32 along a stroke axis 40 which is arranged concentrically with respect to the tube longitudinal axis 37.

The steam probe stroke drive 39 comprises an electric motor 41 and a guide rail 42 which is fastened to the cabinet 5 and predetermines a linear shifting direction. The linear shifting direction is parallel to the stroke axis 40. A guide slide 43 is shiftable along the linear shifting direction on the guide rail 42. The guide slide 43 is substantially formed by a plate to which an angle element 44 is fastened. The angle element 44 is connected at an upper end to the guide slide 43. A baseplate 45 is fastened to a lower end lying opposite the upper end. A plain bearing 46 by means of which the steam probe 32 is guided through the baseplate 45 is inserted into the baseplate 45. The plain bearing 46 is held on the baseplate 45 by means of an adjusting ring 47.

Provided opposite the baseplate 45 is a top plate 48, into which a further plain bearing 46 is inserted, the plain bearing being held in the top plate 48 by means of a further adjusting ring 47. The respective openings in the baseplate 45 and in the top plate 48, through which the steam probe 32 is in each case guided, are arranged concentrically with respect to one another along the stroke axis 40. The baseplate 45 and the top plate 48 are oriented parallel to each other and in particular perpendicularly to the stroke axis 40. The adjusting rings 47 are in each case arranged on an inner side oriented to the opposite plate 45 or 48.

An upper covering 49 is arranged above the top plate 48. The upper covering 49 is of L-shaped design and has a front portion which extends as far as the baseplate 45 arranged at the bottom. This creates a closed motor covering 50 which, on an upper side, has a passage opening 51 through which the steam probe 32 is guided. The motor covering 50 ensures that, even when the enclosure 31 is open, unauthorized, in particular movable, components of a steam probe rotational drive 54 can engage.

A motor bracket 52 is fastened to the angle element 44 along the stroke axis 40 between the baseplate 45 and the top plate 48. The motor bracket 52 extends perpendicularly to the stroke axis 40. The motor bracket 52 is oriented parallel to the baseplate 45 and to the top plate 48. The motor bracket 52 bears the steam probe rotational drive 54 which permits a rotational movement of the steam probe 32 about the stroke axis 40. The steam probe rotational drive 54 has a further electric motor 53 which is held on an upper side of the motor bracket 52. By means of a linear shifting of the steam probe stroke drive 39 along the stroke axis 40, the steam probe rotational drive 54 is shifted at the same time directly along the stroke axis 40. A spindle bearing bracket 55 is fastened to the motor bracket 52. The spindle bearing bracket 55 has an opening, into which a plain bearing 46 is inserted and a spindle 56 is inserted into the latter. The spindle 56 is coupled in a torque-transmitting manner to an output of the electric motor 53 by means of a metal bellows coupling 57. A driving gearwheel 59 is held on the spindle 56 by means of a clamping set 58. The driving gearwheel 59 interacts with a toothed belt 60 which transmits the rotational driving movement to an output gearwheel 61. The output gearwheel 61 is connected in a torque-transmitting manner to the steam probe 32 and in particular to the central tube 34 by means of a further clamping set 58.

The steam supply unit 17 furthermore has a receptacle covering 62 which is also referred to as a steam bell. The receptacle covering 62 is of bell-shaped design with a substantially closed bell upper part 63 and a bell lower part 64 fastened thereto. The bell upper part 63 is fixedly and in particular nonreleasably connected to the bell lower part 64. The bell lower part 64 has a tapering cross section in the direction of the steam-dispensing opening 33 of the steam probe 32. The bell lower part 64 is produced in particular from a sealing material, in particular from stainless steel.

In an upper region, the bell upper part 63 has an opening, into which a sealing element 65 is inserted, said sealing element being fixed and protected, in particular in the axial direction of the stroke axis 40, by means of a cover disk 66. A cylinder web 67, the annular end surface of which serves as a contact surface on a lower side of the baseplate 45, is arranged on an outer side of the receptacle covering 62, in particular on the bell upper part 63.

The receptacle covering 62 is fastened to the steam probe 32 and, in particular with regard to an axial shifting along the stroke axis 40, is fixedly connected to the steam probe 32 with regard to a rotational movement about the stroke axis 40. A linear shifting of the steam probe 32 along the stroke axis 40 and with respect to a rotational movement about the stroke axis 40 directly brings about a linear shifting of the receptacle covering 62. The receptacle covering 62 is shifted jointly with the steam probe 32, either linearly along the stroke axis 40 and/or with a rotational movement about the stroke axis 40.

The cleaning unit 10 comprises a cleaning bowl 68 in which the cleaning spray head 9 is arranged. In the region of its deepest point, the cleaning bowl 68 has a closing opening 69 to which a closing tube 70 with a syphon 71 is connected.

The cleaning bowl 68 has an upper annular flange 72 with which the cleaning bowl 68 can rest on an upper cover plate 73 of the housing 4 and can be screwed thereto by means of fastening screws. On a front side facing the enclosure 31, a support element 74 is fastened to the annular flange 72. The support element 74 serves for the resting thereon of the receptacle-holding unit 21.

The receptacle-holding unit 21 is explained in more detail below. The receptacle-holding unit has an electric motor 75 which drives a toothed belt (not illustrated specifically) which permits linear shifting along a shifting direction. According to FIG. 8, the shifting direction is oriented perpendicularly to the plane of the drawing. A guide rail 76 which is connected fixedly to the cabinet 5 serves for the linear shifting. The guide rail 76 is designed in particular as a metallic lightweight element, in particular as a light metal profiled rail. A guide slide 77 can be shifted linearly along the linear shifting direction on the guide rail 76. An angular fastening element 78 which bears a sealing ring 79 is fastened to the guide slide 77. The sealing ring 79 is of annular design and has a circular receptacle, into which the receptacle 2 can be inserted. The receptacle can rest with an upper radial edge on an upper side of the sealing ring 79 and is therefore securely and reliably and in particular completely held on the receptacle-holding unit 21.

A method for processing food items in the receptacle 2 will be explained in more detail below. The receptacle 2 which is filled with food items, in particular with pasta and sauce, is inserted into the sealing ring 79 of the receptacle holder 21. According to FIG. 1, the receptacle holder 21 is in a depositing/removal position. According to FIG. 1, the depositing/removal position is located at a right end of the guide rail 76. In the depositing/removal position, the receptacle 2 and in particular the sealing ring 79 of the receptacle-holding unit 21 are arranged remotely from the steam supply unit 17. The receptacle 2 which is held in the receptacle-holding unit 21 is arranged above the upper cover plate 73 of the housing in such a manner that the receptacle base is arranged spaced apart from the upper cover plate 73. The receptacle 2 is held exclusively by the receptacle-holding unit 21.

Subsequently, linear shifting takes place along the linear shifting direction 80 into the preparation position shown in FIG. 3. According to FIG. 3, the receptacle 2 with the sealing ring 79 is arranged at a left end of the guide rail 76.

In the preparation position, the receptacle 2 is oriented concentrically with respect to the stroke axis 40. The receptacle 2 is arranged centrally below the steam supply unit 17.

Subsequently, a linear shifting of the steam supply unit 17 takes place by means of the steam probe stroke drive 39. Said stroke movement along the stroke axis 40 downward takes place by linear shifting of the guide slide 43 along the guide rail 42, and in particular of the components connected to said guide slide, i.e. the motor covering 50, the baseplate 55 arranged thereon and the top plate 48 arranged on the latter. Together with the steam probe stroke drive 49, the steam probe 32 is also shifted linearly into a lower food-item-processing position which is illustrated in FIGS. 4 and 5. Together with the steam probe 32, the swivel joint 20 is also shifted and the flexible hose of the supply line 16 is extended or elongated.

In the arrangement shown in FIGS. 4 and 5, the receptacle 2 is closed in a steam-tight manner with the receptacle covering 62. In particular, the conically tapering portion of the bell lower part 64 is formed in a complementary manner to the receptacle 2. In particular, the bell lower part 64 has a thin seal 81 designed as a sealing lip. By shifting along the stroke axis 40 downward, the probe tube 32 enters with the end portions 36 into the food items arranged in the receptacle 2. Owing to the fact that the end portions 36 have different lengths $L_1$, $L_2$, the steam-dispensing openings 33 are arranged in the food items at different height positions along the stroke axis 40. With the, for example, longer first end portions 36, steam can be supplied via the steam-dispensing openings 33 arranged therein to the sauce which is typically arranged at the bottom in the receptacle 2. In a corresponding manner, the other end portions 36 serve for supplying steam to the pasta typically arranged at the top.

For the supply of steam, it is required for water to first of all be supplied via the domestic water connection to the water-softening unit 6 and to be softened there. The softened water passes from the water-softening unit 6 via the hose line 7 and the pump 8 into the steam-generating unit 11. The filling operation lasts until the float switch 27 indicates a maximally permitted filling level. The float switch can have in particular a metal ball which rises with the water filling level and which, via the magnetic valve arranged on the pump 8, automatically ends the supply of water. In addition, the filling level can be read in the boiler container 13 via the inspection glass (not illustrated) which is arranged between the shutoff valve 23 and the sample-removing tap 24.

Subsequently, the water is heated in the boiler container 13 to a temperature of approximately 200° C. by means of the two-stage heating unit. In particular, the heating can take place depending on the pressure and/or temperature and in particular in an automated manner. When the target temperature is reached, the heating unit 26 is deactivated and in particular only one unit of the two-stage heating unit is activated for the reheating. Two different pressure sensors (not illustrated) are arranged in the boiler container. A first pressure sensor serves for the manual adjustment of the boiler pressure via a rotary wheel which is arranged on an outer side of the boiler container 13. In addition, a further pressure sensor can be arranged in the region of the lid of the boiler container 13 in order to permit an electric pressure measurement. A corresponding indication of the boiler pressure can take place via the output/input unit 18.

In addition, a temperature sensor, such as, for example, a Pt100, can take place for the electric temperature measurement and indication at the input/output unit 18. The steam heated to, for example, 200° C. passes via the connecting line 14 into the steam-superheating unit 15. If steaming of the food items in the receptacle 2 is intended to take place, the inlet opening 28 on the steam-superheating unit 15 is switched electrically by means of the magnetic valve 29. Steam from the steam-generating unit 11 can flow through the inlet opening 28 into the steam-superheating unit 15 and can be heated to an adjustable target temperature. The target temperature is typically between 200° C. and 300° C. The flow superheater arranged in the steam-superheating unit 15 comprises a bent tube, through which the steam flows, and a centrally arranged, electric heating element which superheats the supplied steam from the outside. When the target temperature is reached in the steam-superheating unit 15, the latter automatically switches into operation via the control unit of the device 1. As long as no steam is used, the energy consumption for the steam superheater is low. In order to avoid further energy losses, the lines for supplying steam can be thermally insulated. As superheating protection, the steam-superheating unit 15 can have a bimetal in the heating element in order to guarantee an automatic switching off if a threshold temperature is exceeded.

Heat-dissipating elements, in particular heat-conducting baffles which are arranged below the upper cover plate 73, prevent the upper cover plate 73, which acts in particular as a table-top, from unintentionally being greatly heated. The risk of burns and/or painful contact of a user is reduced.

The superheated steam is conducted out of the steam-superheating unit 15 via the supply line 16 into the steam supply unit 17 and in particular there into the steam probe 32 and is dispensed via the steam-dispensing openings 33 in the end portions 36 to the food items in the receptacle 2. At the same time, a stirring movement of the steam probe 32 takes place by means of a rotational movement, which is caused by the steam probe rotational drive 54, of the steam probe 32 about the stroke axis 40. The end portions 36 which are arranged eccentrically with respect to the tube longitudinal axis 37 act as stirring elements. By means of the mechanical stirring of the food items by means of the steam probe 32, on the one hand, and the simultaneous supply of steam via the steam-dispensing openings 33, a homogeneous and uniform mixing of the food items is guaranteed. Owing to the fact that the superheated steam is comparatively dry, an unintentional softening and/or diluting of the food is prevented. The quality of the food processed in this manner is improved.

Figure 3:
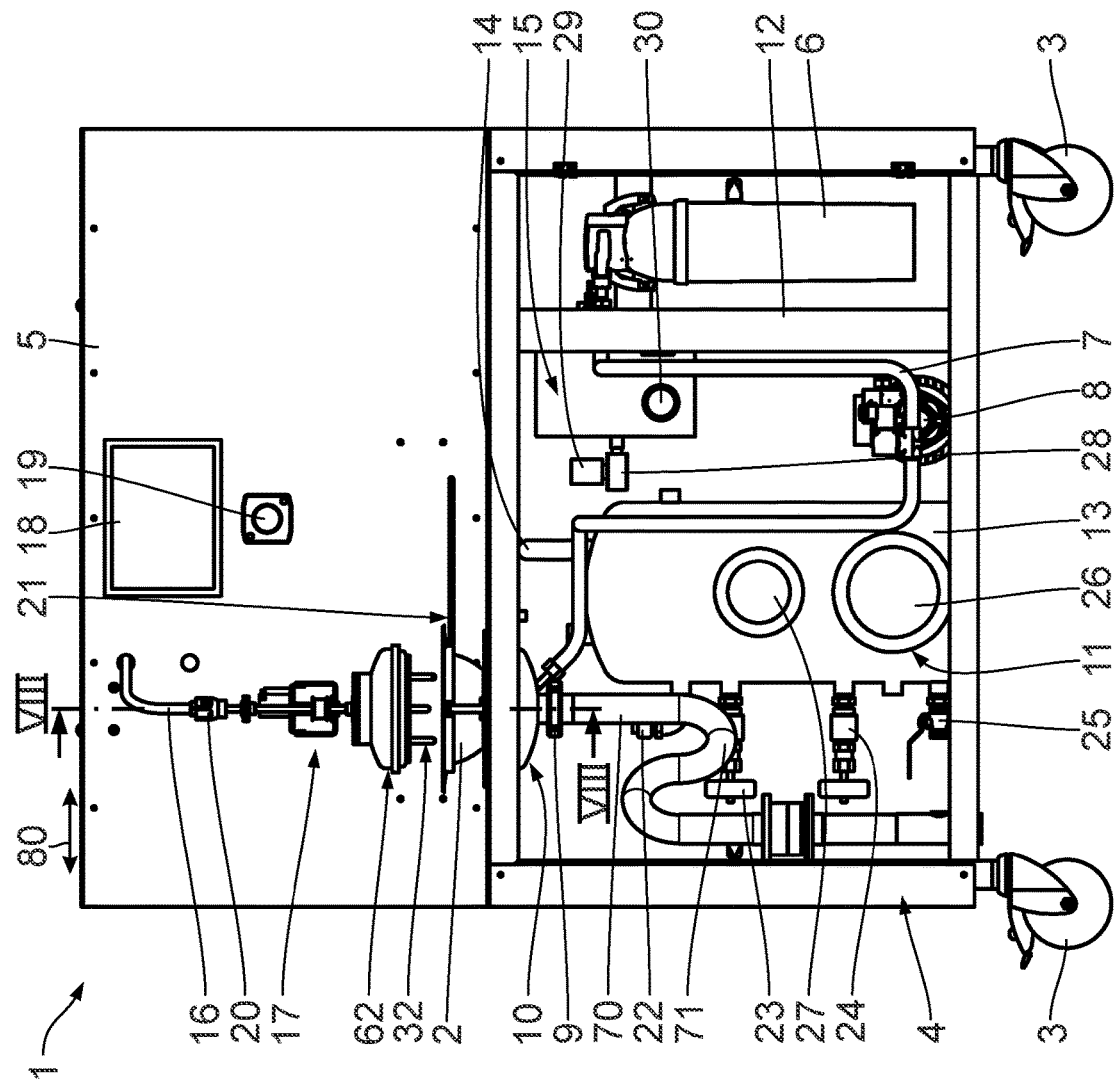
FIG. 3 is a view, corresponding to FIG. 1, of the device in a preparation position.
Figure 8:
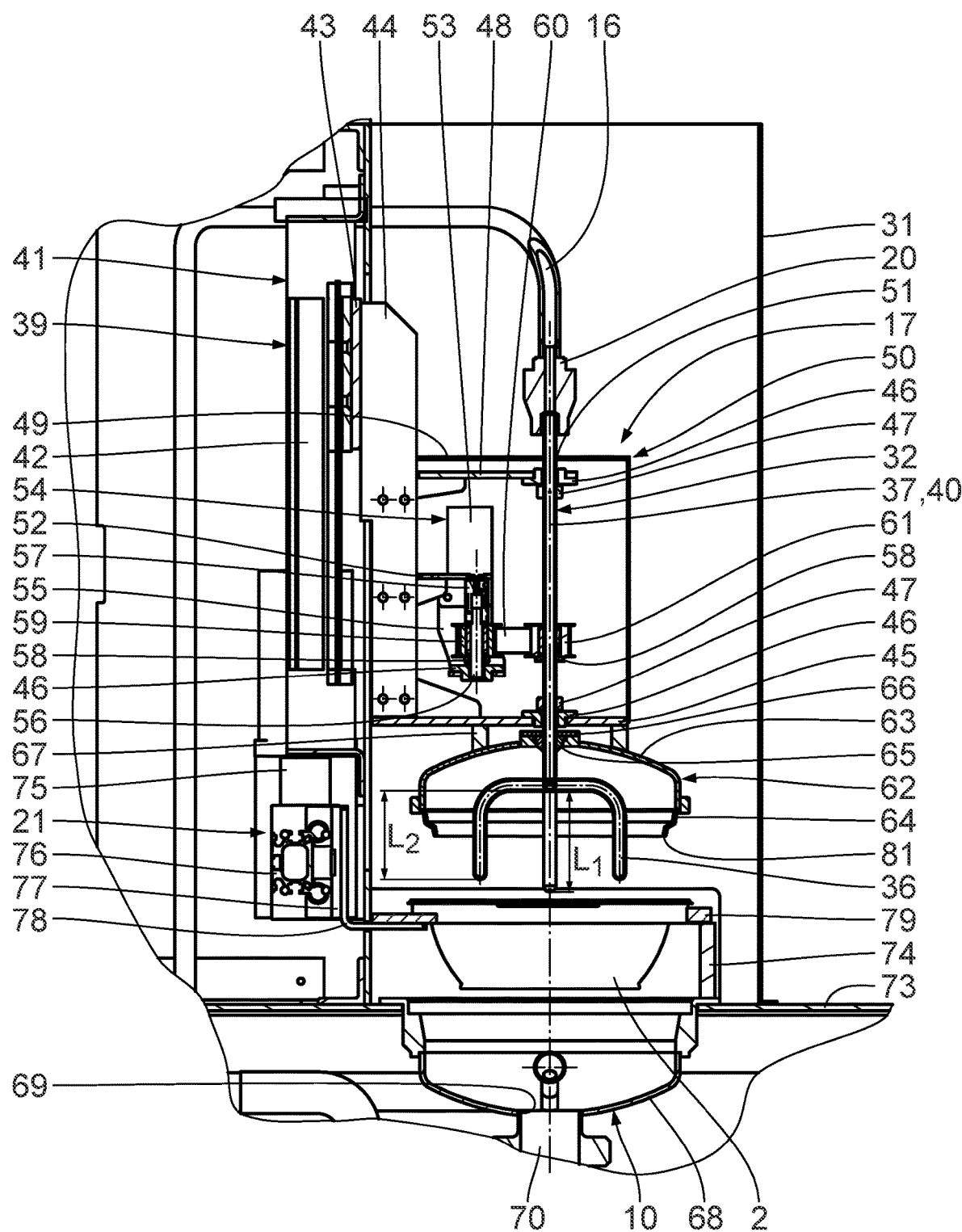
FIG. 8 is an enlarged sectional view according to the intersecting line VIII-VIII in FIG. 3.
Figure 11:
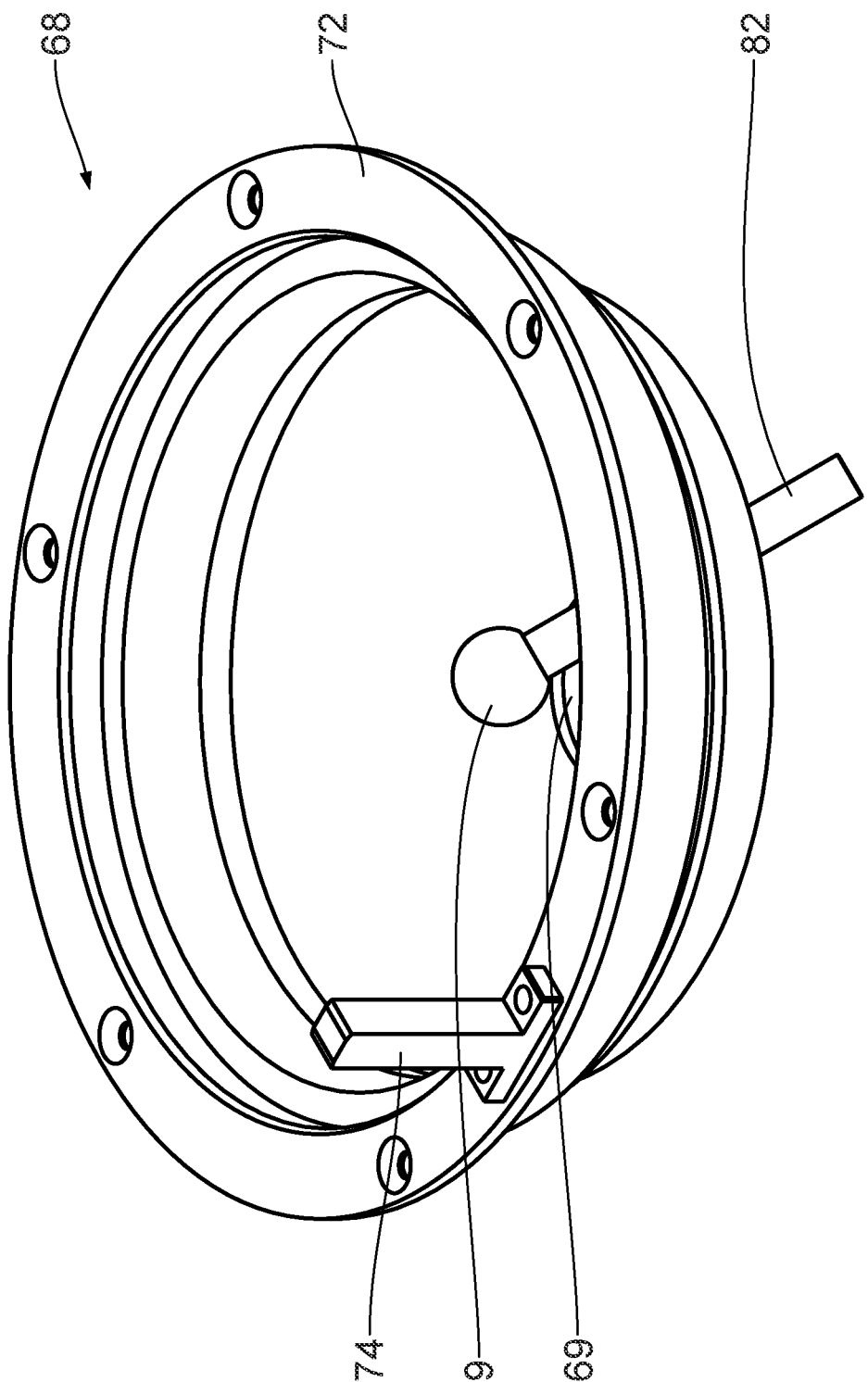
FIG. 11 is an enlarged perspective view of a cleaning unit of the device according to FIG. 1.

After the supply of steam has taken place, the rotational movement of the steam probe 32 is ended, and the steam probe 32 is shifted linearly upward by means of the steam probe stroke drive from the food-item-processing position according to FIGS. 4 and 5 into the preparation position according to FIG. 3. Subsequently, the receptacle 2 with the processed food items is shifted into the depositing/removal position shown in FIG. 1. In the depositing/removal position, the receptacle is arranged outside the enclosure 31.

It may be advantageous if, prior to the preparation of the food items, the contents of the receptacle 2, i.e. the food items to be prepared, are detected. For this purpose, an identification code, for example in the form of a two-dimensional barcode or a three-dimensional "Quick Response or QR Code", can be provided, for example on a lower side of the receptacle 2. The identification code is in particular the EAN code which is in any case already provided on the product. An additional label is unnecessary.

In a corresponding manner, a corresponding read unit is provided in the device 1, said read unit detecting the identification code and transmitting the data linked therewith to the control unit of the device 1. On the basis of the information transmitted in this manner, a subsequent steaming cycle, in particular temperature, pressure and quantity of the input steam, can be defined in a variable manner. For this purpose, prepared preparation data sets can be stored in the control unit and subsequently retrieved in a program-controlled manner in order to prepare the food items. In addition to the data sets, the rotational speed and/or number of rotations can also be varied.

The identification code can also be used to prevent an unintended dish from being processed by means of the device 1. The identification code permits a confirmation prompt. The risk of incorrect operation is reduced.

It is conceivable for more than one steam supply unit 17 to be connected to the steam-superheating unit 15. For example, two or more steam supply units 17 can be connected to the steam-superheating unit 15 via corresponding lines.

It is possible at regular time intervals and/or according to requirements to blow down the boiler container 13 of the steam-generating unit 11. During the blowing-down of the boiler container 13, suspended particles are removed to the outside in order to ensure a continuously malfunction-free operation of the device 1. Use is made for this purpose of the scouring valve 25 which can be opened when required, i.e. during the blowing-down.

Cleaning of the steam probe 32 and of the receptacle covering 62 fastened thereto takes place at regular time intervals and/or depending on the processed food item portions and/or when there is a change of product.

Owing to the fact that the steam probe stroke drive 39 is formed independently of the steam probe rotational drive 54, an independent movement sequence for the steam probe 32 is possible. It is possible, for example, to carry out the stroke movement and the rotational movement sequentially. It is also conceivable to combine the two movements such that, during the linear movement of the steam probe 32, a rotational movement of the steam probe 32 is carried out.

For cleaning of the steam probe 32 with the receptacle covering 62, the steam probe 32 is shifted from the preparation position shown in FIG. 3 a lower cleaning position. In the lower cleaning position, the steam probe 32 with the receptacle covering 62 is arranged on the cleaning bowl 68 of the cleaning unit 10 in such a manner that the receptacle covering 62 closes the cleaning bowl 68 in a steam-tight manner. In said sealing arrangement, steam is sprayed via the cleaning spray head 9 against the steam probe 32, in particular the end portions 36, and against the inner side of the receptacle covering 62. The cleaning head 9 is arranged at one end of a cleaning supply channel 82. The cleaning supply channel is arranged in relation to the vertical at an angle of inclination different from 0. The angle of inclination is in particular between 20° and 70°, in particular between 45° and 70°, and in particular between 65° and 70°, and in particular 67°. The cleaning spray head is designed as a cleaning nozzle and is in particular screwed onto the cleaning supply channel 82. The cleaning spray head 9 has a nozzle opening in the form of a full cone spray nozzle. Cleaning spraying from below obliquely upward is possible with the cleaning spray head 9.

In addition to the supply of steam via the cleaning spray head 9, steam is supplied via the steam probe 32 itself. Dirty water can flow off via the outflow opening 69, the tube 70 and the syphon 71.

By means of the combination of steam and water during the cleaning and the opposed spraying directions from the steam probe 32 and the cleaning spray head 9, reliable and fundamental cleaning of the steam probe 32 and of the receptacle covering 62 is ensured. After the cleaning, the cleaned surfaces are sterile. The surfaces are clean.

While specific embodiments of the invention have been shown and described in detail to illustrate the application of the principles of the invention, it will be understood that the invention may be embodied otherwise without departing from such principles.

The invention claimed is:

1. A device for processing food items arranged in a receptacle, the device comprising:
   a steam-generating unit for generating steam;
   a steam supply unit connected to the steam-generating unit for supplying steam to the receptacle, wherein the steam supply unit has a steam probe, a steam probe stroke drive for a stroke movement of the steam probe along a stroke axis and a steam probe rotational drive for a rotational movement of the steam probe about the stroke axis, wherein the steam probe rotational drive is coupled to the steam probe stroke drive such that the steam probe rotational drive is shifted together with the steam probe stroke drive along the stroke axis, the steam probe having at least one steam-dispensing opening.

2. The device as claimed in claim 1, wherein the steam probe comprises another steam-dispensing opening to provide at least a plurality of steam-dispensing openings.

3. The device as claimed in claim 2, wherein the plurality of steam-dispensing openings comprises a first steam-dispensing opening and a second steam-dispensing opening, the first steam-dispensing opening being arranged in a first plane oriented perpendicularly to the stroke axis, the second steam-dispensing opening being arranged in a second plane oriented perpendicularly to the stroke axis, and the first plane and the second plane being arranged spaced apart from each other along the stroke axis.

4. The device as claimed in claim 1, further comprising a receptacle covering, which is fastened to the steam probe, for lying in a sealing manner against the receptacle during a supply of steam.

5. The device as claimed in claim 1, further comprising: a receptacle-holding unit.

6. The device as claimed in claim 5, wherein the receptacle-holding unit comprises a receptacle-shifting drive.

7. The device as claimed in claim 1, further comprising: a cleaning unit for cleaning the steam supply unit.

8. The device as claimed in claim 7, wherein the cleaning unit has a cleaning bowl and a cleaning spray head.

9. The device as claimed in claim 8, wherein a receptacle covering lies in a sealing manner against the cleaning bowl in a cleaning position.

10. The device as claimed in claim 1, further comprising: a steam-superheating unit, which is connected to the steam-generating unit, for superheating the steam generated in the steam-generating unit.

11. The device as claimed in claim 1, further comprising: a water-softening unit.

12. The device as claimed in claim 1, wherein the steam probe has a shaft and a plurality of free end portions connected directly to the shaft such that the plurality of free end portions rotate based on rotation of the shaft, wherein each of the plurality of free end portions has at least one steam-dispensing opening.

13. The device as claimed in claim 12, further comprising: a swivel joint rotatably coupling the steam probe to a supply line such that the steam probe is rotatable relative to the supply line, wherein the supply line does not rotate based on rotation of the steam probe, wherein the shaft and the free end portions define a mixing means for mixing the food items arranged in the receptacle.

14. The device as claimed in claim 13, further comprising a receptacle covering for lying in a sealing manner against the receptacle during a supply of steam to define a mixing chamber for mixing the food items arranged in the receptacle, the mixing means being arranged in the mixing chamber during the supply of steam.

15. The device as claimed in claim 14, wherein the receptacle covering is located at a position above the free ends positions.

16. The device as claimed in claim 15, wherein at least a portion of the receptacle covering extends to a position located radially beyond the free end portions with respect to a longitudinal axis of the shaft.

17. The device as claimed in claim 12, wherein each steam-dispensing opening is parallel to the shaft and faces in a direction away from the shaft, wherein a shaft portion of the shaft engages a first portion of the swivel joint and a supply line portion of the supply line engages a second portion of the swivel joint.

18. A device for processing food items arranged in a receptacle, the device comprising:
a steam-generating unit for generating steam;
a steam supply unit is connected to the steam-generating unit for supplying steam to the receptacle, wherein the steam supply unit has a steam probe, and a steam probe stroke drive for a stroke movement of the steam probe along a stroke axis, the steam probe having a central tube and a plurality of free end portions, each of the plurality of free end portions extending directly from the central tube of the steam probe, wherein each of the plurality of free end portions has at least one steam-dispensing opening.

19. The device as claimed in claim 18, wherein at least two of the plurality of free end portions have different lengths.

20. A device for processing food items arranged in a receptacle, the device comprising:
a steam-generating unit for generating steam;
a steam supply unit is connected to the steam-generating unit for supplying steam to the receptacle, wherein the steam supply unit has a steam probe and a steam probe stroke drive for a stroke movement of the steam probe along a stroke axis, the steam probe having at least one steam-dispensing opening; and
a swivel joint rotatably coupling the rotatable steam probe to a non-rotatable supply line such that rotation of the steam supply unit does not lead to rotation of the supply line.

* * * * *